United States Patent [19]
Conrad

[11] Patent Number: 4,712,998
[45] Date of Patent: Dec. 15, 1987

[54] MIXING ARRANGEMENT FOR A COMBUSTIBLE GAS MIXTURE

[75] Inventor: Hans-Jürgen Conrad, Rutesheim, Fed. Rep. of Germany

[73] Assignee: Robert Bosch GmbH, Stuttgart, Fed. Rep. of Germany

[21] Appl. No.: 932,504

[22] PCT Filed: Feb. 8, 1986

[86] PCT No.: PCT/DE86/00045
§ 371 Date: Oct. 9, 1986
§ 102(e) Date: Oct. 9, 1986

[87] PCT Pub. No.: WO86/05258
PCT Pub. Date: Sep. 12, 1986

[30] Foreign Application Priority Data
Mar. 5, 1985 [DE] Fed. Rep. of Germany ....... 3507669

[51] Int. Cl.⁴ .............................................. F27B 3/00
[52] U.S. Cl. .................................... 432/159; 239/425; 431/159

[58] Field of Search ............... 432/159, 57, 222; 239/425, 434.5; 431/159

[56] References Cited
U.S. PATENT DOCUMENTS

| | | | |
|---|---|---|---|
| 3,666,252 | 5/1972 | Rice | 432/57 |
| 4,125,359 | 11/1978 | Lempa | 239/425 |
| 4,284,239 | 8/1981 | Ikeuchi | 239/425 X |
| 4,526,322 | 7/1985 | Voorheis | 239/425 |

Primary Examiner—Edward G. Favors
Attorney, Agent, or Firm—Michael J. Striker

[57] ABSTRACT

A mixing arrangement for mixing a combustible gas mixture consisting of at least two gas components for treatment of materials by means of temperature and pressure shocks, comprises for each gas component a feeding line discharging into a mixing chamber. At the discharge area of each of the feeding lines a jet arrangement is provided which forces gas flows discharged from the jet arrangement to take a shape and direction which enhance the admixture thereof before they enter the mixing chamber.

8 Claims, 4 Drawing Figures

MIXING ARRANGEMENT FOR A COMBUSTIBLE GAS MIXTURE

BACKGROUND OF THE INVENTION

The present invention relates to a mixing block or arrangement for a combustible gas mixture fed to a combustion chamber of a device for treating workpieces. In the particularly related known installations for thermal deburring of workpieces a chemical process occurs due to the influence of heat. The material to be deburred is oxidized with oxygen and burnt. The heat shock which is required for deburring is generated by burning off a combustion gas-oxygen mixture, whereby hydrogen or natural gas or methane may be used as a combustion gas, for example so that the required energy is released and the gas mixture must be compressed before the igniting. This is usually performed with the aid of dosaging cylinders and gas push by the pistons of the cylinders. The admixing of the gas components and igniting of the gas mixture is performed in a mixing block which contains an ignition device for igniting the gas mixture as well as a mixing chamber.

The proper igniting and rapid combustion of the gas mixture depends, among others, decisively from a good uniform admixing of the gas components in the area of location of the ignition device and the combustion chamber of the work piece finishing chamber. It is known from DE-OS No. 30 15 393 that to improve the mixture preparation in that the feeding lines for the gas components discharge tangentially into the mixing space designed as a bore of the mixing chamber. Thus, a strong twisted flow is generated and thereby an intensive admixing of the gas components. Such a mixing block is relatively volumnious and correspondingly expensive in the geometry of the feeding lines and the mixing chamber, caused by the tangential input for the gas components.

SUMMARY OF THE INVENTION

It is an object of the present invention to provide an improved mixing arrangement for mixing different gas components of a gas mixture to be fed into a combustion chamber of the device for treatment workpieces for example for deburring. It is a further object of the invention to provide a mixing block in which the gas flows before entering the mixing chamber are so shaped and deflected by a jet arrangement that an intimate and uniform admixing of the gas components occurs. Moreover, the jet arrangement in accordance with the invention is advantageous in that the feeding lines for the gas components and the mixing chamber are not fixed by a defined geometry with respect to their common arrangement, which is advantageous with respect to the size and the constructive design of the mixing block.

It is particularly advantageous with respect to the cost effective manufacturing and compact mode of construction that the combustion chamber of a work piece finishing chamber is used as a mixing chamber, the walls of which are provided with receptacles for the jet arrangement and for an ignition device for igniting the gas mixture. It is known from DE-PS No. 21 22 221 to use the combustion chamber of a work piece treatment chamber simultaneously as a mixing chamber for the gas components, however the feeding lines for the gas components which are shaped as parallel bores in the head portion of the treatment chamber discharge immediately into the combustion chamber, whereby the gases are insufficiently admixed. Preferably, the mixture preparation is performed by the jet arrangement which consists of a slotted nozzle feeding the gas component, preferably an annular slotted nozzle and a multihole nozzle for a second gas component directed to the gas flow discharging from the slotted nozzle. Due to this nozzle geometry the gas component discharging from the multihole nozzle is injected into the flow of the gas component discharging from the slotted nozzle. A good ignitable mixture is generated. For forming the annular slot a bore may be formed in the wall of the mixing chamber and an annular bolt made of heat resistant material may be centrically inserted therein. Such bolts are relatively small structural elements which can be simply made, and interchange of these bolts as highly stressed wear parts is possible with low costs. The end of the bolt facing the mixing chamber preferably extends beyond the wall face of the mixing chamber containing the bore for the bolt, whereby in the area of this extension the multiple hole nozzle is mounted in or on the bolt. Thus, additional structural parts for making the multiple hole nozzle are eliminated.

DETAILED DESCRIPTION OF THE PREFERRED EMBODIMENTS

Figure 1:
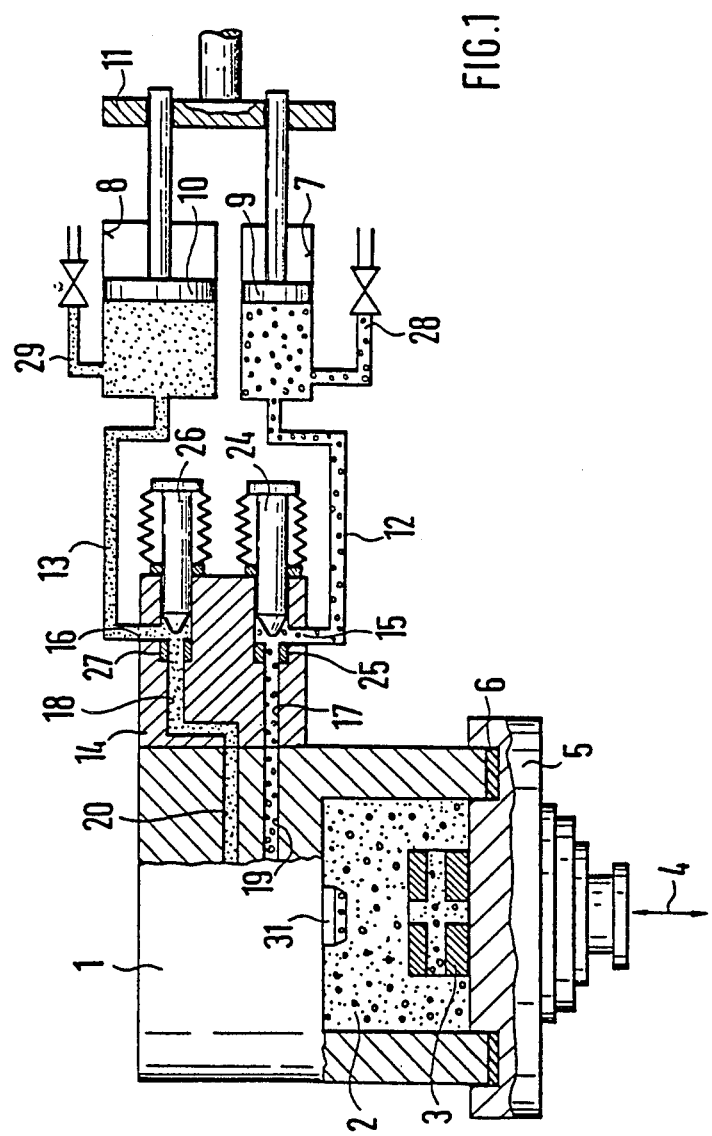
FIG. 1 is a schematic view of an installation for a thermal deburring of work pieces.

A treatment chamber for deburring work pieces is designated with the reference numeral 1 in FIG. 1. In the combustion chamber 2 of chamber 1 a work piece 3 to be deburred is placed. The work piece 3 rests on a locking plate 5 movable in the direction of the double arrow 4. Plate 5 is applied to the front face of the treatment chamber 1 before filling the combustion chamber 2 with a combustion gas-oxygen mixture and igniting the same. A packing 6 is provided between plate 5 and the front face.

The gas components of the combustion gas-oxygen mixture are fed into the combustion chamber 2 which also is used as the mixing chamber by means a dosaging cylinder 7 for combustion gas and a dosaging cylinder 8 for oxygen by means of gas pushing piston 9 and 10. The pistons 9,10 are coupled with each other by means of a yoke 11, so that they execute strokes of the same magnitude under the influence of a force which engages on the yoke.

Figure 2:
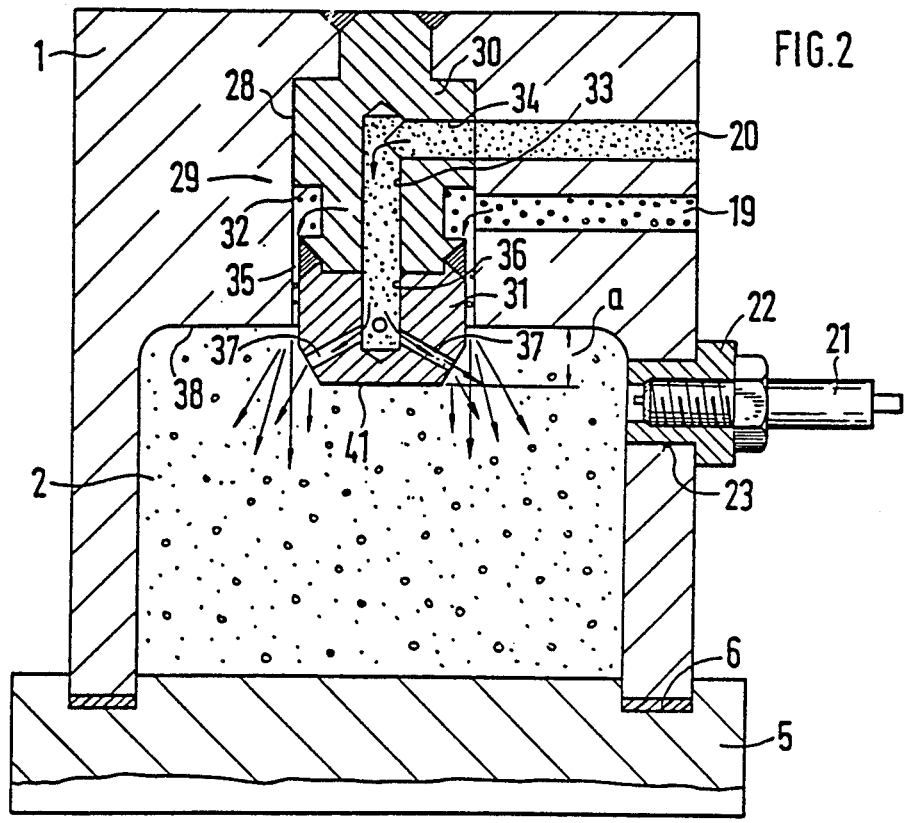
FIG. 2 is a longitudinal section through the work piece-treatment chamber.

Each pressure resistant feeding line 12, 13 extends from the dosaging cylinders 7,8 into a valve block 14 which consists of a massive metal block. The feeding lines 12, 13 each discharge into a connecting bore 15 or 16 in the valve block 14 and subsequent bores 17 or 18. The bores 17,18 merge into bores 19, 20 extending transversely through the head part of the treatment chamber 1. Bores 19, 20 feed the combustion gas and oxygen into the combustion chamber 2 of the treatment chamber. A spark plug 21 (FIG. 2) is used for igniting the gas mixture contained in combustion chamber 2, whereby this spark plug is mounted in a socket 22 which is mounted in a bore 23 provided in the side wall of chamber 1. Valves 24,25 or 26,27 are provided between bores 15,17 and 16,18, respectively. These valves are opened at the start of the gas pushing process and are closed again after the gas pushing process is finished when the pistons 9,10 have reached their end position and no gas is present in cylinders 7,8 any longer.

A cylindrical bolt 29 made from heat resistant material is mounted in a central bore 28 of the head part of the treatment chamber 1. The bolt 29 consists of two parts 30,31 which are welded together and have different diameters. The upper piece 30, whose diameter corresponds to that of bore 28 is provided with an annular groove 32 into which bore 19 discharges which feeds the oxygen. Moreover, this upper piece 30 is provided with a central vertical bore 33 and a transverse bore 34 extending therefrom and providing the connection to bore 20 which feeds the combustion gas into the bolt 29.

The lower piece 31 of bolt 29 has a somewhat smaller diameter than bore 28. Thus an annular slot 35 is formed, through which oxygen as the one gas component is fed into the combustion chamber 2, which also serves as the mixing chamber, by means of bore 19 and the annular groove 32. Thereby, a peripheral flow is generated encompassing the lower piece 31 of the bolt. The lower piece 31 has a pocket borehole 36 which is flush with the vertical bore 33 of upper piece 30. A plurality of radial bores 37 extend from bore 36 and discharge into the combustion chamber 2 in the area of the circumferential face of the lower piece 31. The end of the lower piece 31 which faces the combustion chamber 2 has an extension a with respect to the wall face 38 of combustion chamber 2. Chamber 1 is provided with the bore 28 for bolt 29. Bores 37 form in extension a discharge into the combustion chamber. In the exemplified embodiment the bores 37 as illustrated are slightly inclined. Together, they are forming the multiple hole jet or nozzle arrangement which injects the combustion gas in a jet like manner into the oxygen-peripheral flow which discharges from the annular slot 35. Thus an intimate uniform admixing of the two gas components is obtained and a good ignitable mixture is formed.

Figures 3, 4:
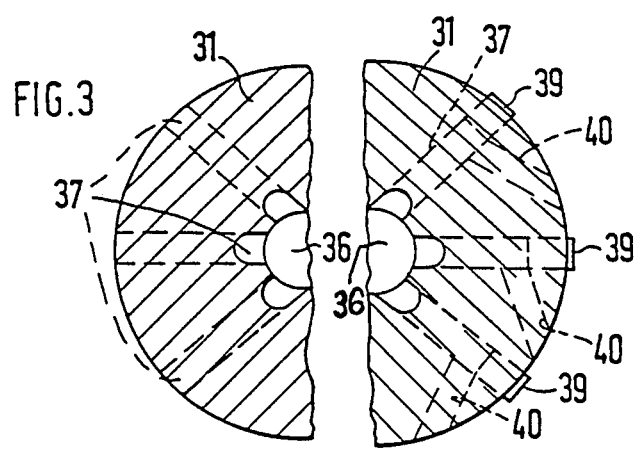
FIG. 3 is a cross section through a part of a bolt provided in the work piece-treatment chamber in the area of a multiple hole nozzle in the bolt.
FIG. 4 is a cross section through a bolt with a multiple hole nozzle different from the one of FIG. 3.

In the lower piece 31 of bolt 29 illustrated in cross section in FIG. 4 the radial bores 37 are closed by plugs 39. Bores 40 extend from radial bores 37 and discharge tangentially into the combustion and mixing chamber 2. The discharging into chamber 2 takes place in the same direction of rotation. A strong twist flow is generated due to the tangential feeding of the gas jets which exit through bores 40. Thereby, an overlapping of a rotational flow with an axial flow occurs, whereby the axial flow is the jacket like gas flow which is formed by the annular slot 35. This results in an intensive admixing of combustion gas and oxygen and thereby a very easily ignitable mixture.

Instead of mounting the jet arrangement in a work piece-treatment chamber the jet arrangement may also be provided in a separate mixing block which is flanged to the chamber treatment and provided with an ignition device as well as a mixing chamber, whereby a gas feeding line is provided discharging into the combustion chamber of the work piece-treatment chamber. The type of structure of the exemplified embodiment is also advantageous in that the combustion chamber of the work piece-treatment chamber is also the mixing chamber for the gas components, so that a separate block may merely contain the valves which close the gas feeding lines during the deburring process, thus separating the combustion chamber from the gas supply. The front face of the bolt 29 which faces the combustion chamber 2 acts as an impact face which protects the valve block 14 against pressure and heat wave which is generated by the explosion of the gas mixture so as to protect its service life.

By using a round bolt designed as a wear part a jet arrangement can be surprisingly realized so as to force a shape and direction of the gas flows which enhances the admixture thereof before entering the mixing chamber. The peripheral face of the bolt forms an annular slot nozzle together with the wall of the bore receiving the bolt for the one gas component, while the radial bores provided in the bolt form a multiple hole jet or nozzle which injects the discharging gas jets into the jacket like gas flow generated by the annular slot 35.

The installation as illustrated in FIG. 1 is not only suitable for a thermal deburring of work pieces, but is also suitable for further fields of use. With such an installation the process of reticulating of foamed material in accordance with DE-Patent No. 15 04 096 or the process for removing of foam material, for example, in accordance with DE-Patent No. 23 22 760 may be performed. There are many further field of use, wherein work pieces are finished by an explosive gas mixture. The scope of protection of the device in accordance with the invention naturally extends to these further field of use.

It will be understood that each of the elements described above, or two or more together, may also find a useful application in other types of mixing blocks for combustible gas mixtures differing from the types described above.

While the invention has been illustrated and described as embodied in a mixing block for a combustible gas mixture, it is not intended to be limited to the details shown, since various modifications and structural changes may be made without departint in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mixing arrangement for a combustible gas mixture consisting of at least two gas components for treating materials by means of temperature and pressure shocks obtained by igniting the gas mixture, in particular for thermic deburring installations, comprising a mixing chamber; an ignition device; and feeding lines for feeding gas components into the mixing chamber and discharging into the mixing chamber, the feeding lines being each provided in a discharging area thereof with a jet arrangement (35, 37, 40) which forces gas flows discharged therefrom to take a sharp and direction which enhance the admixture of the gas components before they enter the mixing chamber (2); the jet arrangement (35, 37, 40) including an annular slot jet (35) for feeding one gas component and a multiple hole jet (37, 40) for a second gas component and directed towards a gas flow discharging from the annular slot jet, said annular slot jet (35) being formed by a bore (28) provided in a wall of the mixing chamber and a bolt (29)

centrally inserted in said bore and made from a heat resistant material, said bolt having one portion (31) which has an end which faces the mixing chamber (2) and has an extension (a) projecting from a wall face (38) of the mixing chamber, and another portion (30), said multiple hole jet (37, 40) being formed in said extension at said end of said one portion.

2. Mixing arrangement in accordance with claim 1, wherein a combustion chamber of a work piece-treatment chamber (1) serves as said mixing chamber (2) which has walls provided with recesses (28, 23) for receiving the jet arrangement (35, 37, 40) and the ignition device (21) for igniting the gas mixture.

3. Mixing arrangement in accordance with claim 1, wherein the annular slot jet (35) is connected to one of the gas feeding lines (19) by an annular groove (32) formed in said bolt (29).

4. Mixing arrangement in accordance with claim 1, wherein the bolt (29) has a central bore (33, 36) connected to one of the gas feeding lines (20), said multiple hole jet includes radial bores (37) connected to and extending from said central bore and discharging into the mixing chamber (2) in the region of said extension.

5. Mixing arrangement in accordance with claim 4, wherein the radial bores (37) of the multiple hole jet extending from the central bore (33, 36) are inclined with respect to a longitudinal axis of the bolt (29) toward the mixing chamber (2).

6. Mixing arrangement in accordance with claim 4, wherein the radial bores (37) extending from the central bore (33, 36) are each closed by a plug (39), said multiple hole jet further including additional bores (40) which extend from the radial bores and discharge tangentially into the mixing chamber (2).

7. Mixing arrangement in accordance with claim 5, wherein the radial bores (37) extending from the central bore (33, 36) are each closed by a plug (39), said multiple hole jet further including additional bores (40) which extend from the radial bores and discharge tangentially into the mixing chamber (2).

8. A mixing arrangement for a combustible gas mixture consisting of at least two gas components for treating materials by means of temperature and pressure shocks obtained by igniting the gas mixture, in particular for thermic deburring installations, comprising a mixing chamber; an ignition device; and feeding lines for feeding gas components into the mixing chamber and discharging into the mixing chamber; the feeding lines being each provided in a discharging area thereof with a jet arrangement (35, 37, 40) which forces gas flows discharged therefrom to take a shape and direction which enhance the admixture of the gas components before they enter the mixing chamber (2), wherein a combustion chamber of a work piece-treatment chamber (1) serves as said mixing chamber (2) which has walls provided with recesses (28, 23) for receiving the jet arrangement (35, 37, 40) and the ignition device (21) for igniting the gas mixture, the jet arrangement including an annular slot jet and a multiple hole jet, the annular slot jet being formed by a bore (28) in a wall of the mixing chamber and a bolt inserted in said bore, said bolt having an extension projecting into the combustion chamber and a central bore (33, 36) connected to one of the gas feeding lines (20), said multiple hole jet including radial bores (37) connected to and extending from said central bore and discharging into the mixing chamber (2) in the region of said extension, the radial bores (37) of the multiple hole jet extending from the central bore (33, 36) and being inclined with respect to a longitudinal axis of the bolt (29) toward the mixing chamber (2), each radial bore being closed by a plug (39), said multiple hole jet further including additional bores (40) which extend from the radial bores and discharge tangentially into the mixing chamber (2).

* * * * *